(12) United States Patent
Jeng

(10) Patent No.: US 12,103,697 B2
(45) Date of Patent: Oct. 1, 2024

(54) AIRCRAFT

(71) Applicant: HELENG INC., Temple City, CA (US)

(72) Inventor: Jack Ing Jeng, Arcadia, CA (US)

(73) Assignee: HELENG INC., Temple City, CA (US)

( * ) Notice: Subject to any disclaimer, the term of this patent is extended or adjusted under 35 U.S.C. 154(b) by 245 days.

(21) Appl. No.: 17/647,525

(22) Filed: Jan. 10, 2022

(65) Prior Publication Data

US 2022/0281614 A1  Sep. 8, 2022

Related U.S. Application Data

(63) Continuation of application No. 17/249,627, filed on Mar. 8, 2021, now Pat. No. 11,247,783.

(51) Int. Cl.
| | | |
|---|---|---|
| *B64D 35/06* | (2006.01) | |
| *B64C 1/00* | (2006.01) | |
| *B64C 11/00* | (2006.01) | |
| *B64C 11/48* | (2006.01) | |
| *B64C 25/56* | (2006.01) | |
| *B64C 29/00* | (2006.01) | |
| *B64D 17/80* | (2006.01) | |

(52) U.S. Cl.
CPC ............ *B64D 35/06* (2013.01); *B64C 1/0009* (2013.01); *B64C 11/001* (2013.01); *B64C 11/48* (2013.01); *B64C 25/56* (2013.01); *B64C 29/0033* (2013.01); *B64D 17/80* (2013.01)

(58) Field of Classification Search
CPC ....... B64C 11/001; B64C 11/48; B64C 25/56; B64C 29/0033
See application file for complete search history.

(56) References Cited

U.S. PATENT DOCUMENTS

| | | | | |
|---|---|---|---|---|
| 2,584,115 | A | * | 2/1952 | Dinsmoor ............... B64C 11/48 |
| | | | | 416/129 |
| 3,089,666 | A | | 5/1963 | Quenzler |
| 3,154,270 | A | | 10/1964 | Jensen |
| 3,240,449 | A | | 3/1966 | Robinson |

(Continued)

OTHER PUBLICATIONS

Ball, AirMap to Supply UTM Services to USAF eVTOL Program, Unmanned Systems Technology, Sep. 25, 2020, 19 pages. Accessed Online: https://www.unmannedsystemstechnology.com/2020/09/airmap-to-supply-utm-services-to-usaf-evtol-program/.

(Continued)

*Primary Examiner* — Philip J Bonzell
*Assistant Examiner* — Michael B. Kreiner
(74) *Attorney, Agent, or Firm* — MLO, a professional corp.

(57) ABSTRACT

An aircraft includes a fuselage having a top surface opposite a bottom surface, a front section, a center section, and a rear section. A first mounting rod and a second mounting rod are coupled to the top surface. The first mounting rod and the second mounting rod are single rods. A first and a second wing are coupled to the center section. A plurality of power generator systems are coupled to the first mounting rod or the second mounting rod. Each power generator system includes a power source, a first propeller and a second propeller. The power source is configured to drive the first propeller and the second propeller. The first propeller and the second propeller have an axis of rotation, and are pivotable between a first position and a second position. A shroud encloses the power generator system.

19 Claims, 17 Drawing Sheets

(56) References Cited

U.S. PATENT DOCUMENTS

| | | | |
|---|---|---|---|
| 3,265,142 A | 8/1966 | Winter | |
| 3,291,242 A | 12/1966 | Tinajero | |
| 3,360,217 A | 12/1967 | Trotter | |
| 3,507,466 A | 4/1970 | Fleur | |
| 3,591,109 A * | 7/1971 | McLarty | B64C 1/06 244/17.23 |
| 3,738,597 A | 6/1973 | Earl et al. | |
| 4,697,762 A | 10/1987 | Arney | |
| 7,267,300 B2 * | 9/2007 | Heath | B64C 29/0025 244/12.3 |
| 7,472,863 B2 * | 1/2009 | Pak | B64D 35/04 244/12.5 |
| 7,806,362 B2 | 10/2010 | Yoeli | |
| 7,874,513 B1 * | 1/2011 | Smith | B64C 11/001 244/12.4 |
| 8,322,647 B2 * | 12/2012 | Amraly | B64C 11/001 244/12.4 |
| 8,720,814 B2 * | 5/2014 | Smith | B64D 17/34 244/12.4 |
| 8,870,115 B2 | 10/2014 | Lu et al. | |
| 9,045,226 B2 | 6/2015 | Piasecki et al. | |
| 9,187,174 B2 | 11/2015 | Shaw | |
| 9,493,235 B2 * | 11/2016 | Zhou | G08G 3/02 |
| 9,499,263 B2 * | 11/2016 | Youngblood | B64C 30/297 |
| 9,623,967 B2 * | 4/2017 | Mallard | B64U 30/297 |
| 9,776,715 B2 | 10/2017 | Zhou et al. | |
| 10,293,932 B2 * | 5/2019 | Alzahrani | B64C 29/0033 |
| 10,384,774 B2 * | 8/2019 | Vondrell | B64C 27/28 |
| 10,787,255 B2 * | 9/2020 | George | B64U 30/293 |
| 11,220,325 B2 * | 1/2022 | Kiesewetter | B64C 27/20 |
| 11,345,474 B2 * | 5/2022 | Jeng | B64U 10/20 |
| 11,820,511 B2 * | 11/2023 | Jarvis | B64C 39/024 |
| 2006/0226281 A1 * | 10/2006 | Walton | B64C 27/20 244/17.23 |
| 2019/0202570 A1 | 7/2019 | Smith et al. | |

OTHER PUBLICATIONS

Contra-rotating propellers, Wikipedia, page last updated Jan. 2, 2021, 6 pages, Accessed Online: https://en.wikipedia.org/wiki/Contra-rotating_propellers.

Hampel, Geely-owned Terrafugia completes eVTOL test flights, electrive.com, Jun. 25, 2020, 2 pages, Accessed Online: https://www.electrive.com/2020/06/25/terrafugia-completes-evtol-test-flights/.

Kilgore, Archer Aviation gets a $1 billion order from United Airlines, on the same day it announces a deal to go public, Marketwatch.com, Feb. 10, 2021. 4 pages. Accessed online: https://www.marketwatch.com/story/archer-aviation-gets-a-1-billion-order-from-united-airlines-on-the-same-day-it-announces-a-deal-to-go-public-11612983906.

Malewar, Archer, an eVTOL startup working on four passengers 150 mph aircraft, InceptiveMind.com, Jun. 20, 2020, 2 pages, Accessed Online: https://www.inceptivemind.com/archer-evtol-startup-four-passengers-150-mph- aircraft/13941/.

Notice of Allowance and Fees dated Oct. 6, 2021 for U.S. Appl. No. 17/249,627.

Office Action dated Jul. 8, 2021 for U.S. Appl. No. 17/249,627.

Pritchard, Vertical Aerospace Reveals Its New Evtol Aircraft—The VA-1X, eVTOLinsights.com, Aug. 26, 2020, 3 bages, Accessed Online: https://evtolinsights.com/2020/08/vertical-aerospace-reveals-its-new-evtol-aircraft-the-va-1x/.

Static Thrust Calculator, godolloairport.hu, 2 pages, Accessed online on Feb. 25, 2021, http://godolloairport.hu/calc/strc_eng/index.htm.

Video, Terrafugia's eVTOL Concept Taps Hybrid Tech and Detachable Passenger Pods—AINtv, Aviation International News, Nov. 14, 2018, Accessed Online: https://www.youtube.com/watch?app=desktop&v=6Py7mdydnY4.

* cited by examiner

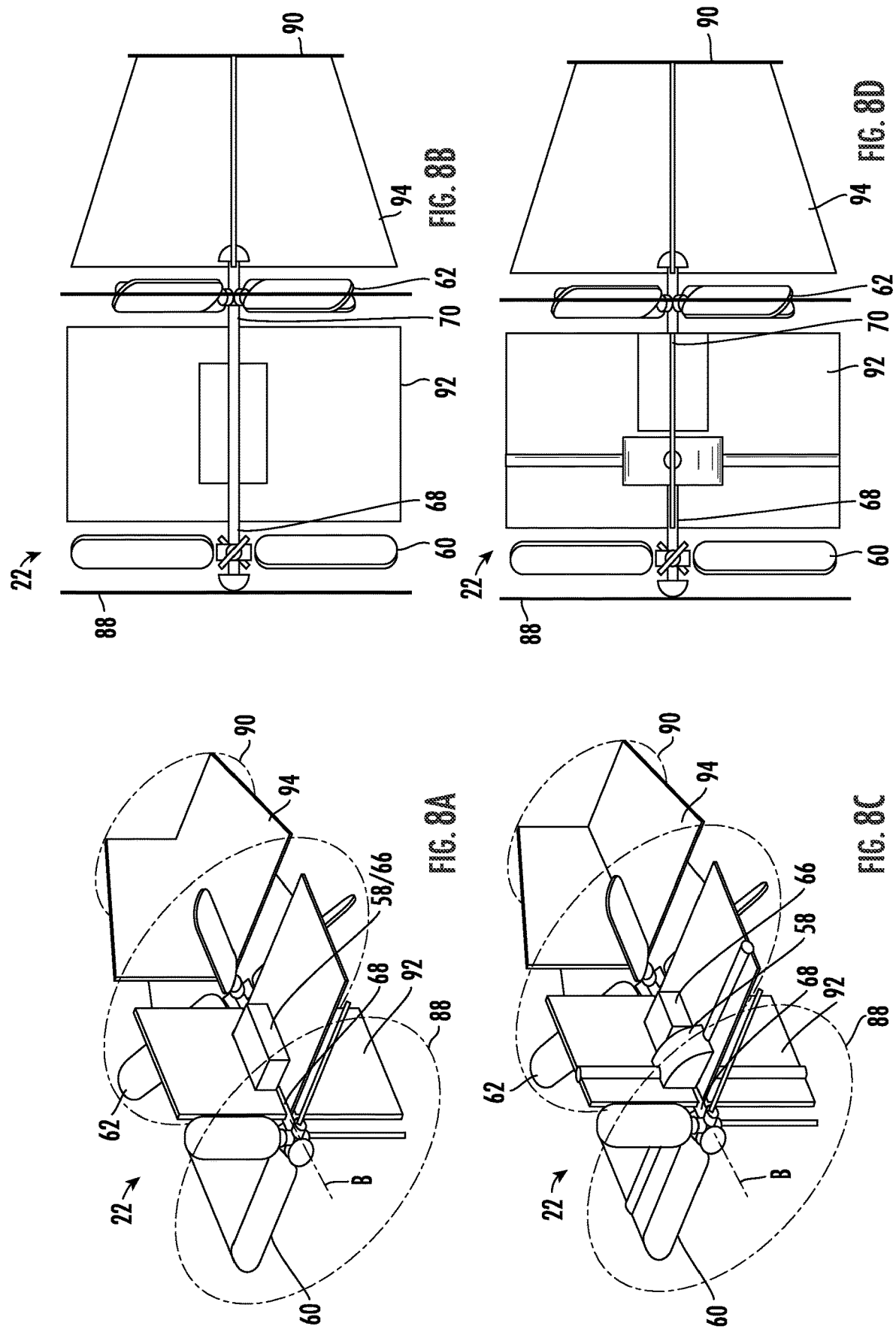

TABLE 1
WING AREA CALCULATION

|  | LENGTH (FT) | WIDTH (FT) | QTY | TOTAL FT ^ 2 |
|---|---|---|---|---|
| FIXED WINGS | 30 | 9 | 2 | 540 |
| FLAP | 10 | 9 | 4 | 360 |
|  |  |  | TOTAL AREA | 900 |

FIG. 13A $$C_L = \frac{2L}{\rho V^2 A}$$

TABLE 2

| V= | 107 | KM/HR |
|---|---|---|
| P= | 1.13 | KG/M^3 |
| WING AREA | 900 | FOOT^2 |
| CL | 2.6 | (FLAP DOWN) |
| LIFT= | 11064 | KG FORCE |

FIG. 13B

TABLE 3

| | | |
|---|---|---|
| PROPELLER DIAMETER | 76 | INCH |
| PITCH | 12 | INCH |
| PROPELLER TYPE | APC W PROPELLER ⌄ | |
| | CF 1.09 | |
| NO. OF BLADES | 4 ⌄ | |
| RPM | 3000 | |
| AIR TEMPERATURE | 68 FAHRENHEIT ⌄ | |
| AIR DENSITY | 1.2045 | (KG/M³) |

| | | |
|---|---|---|
| STATIC THRUST = | 24276.24 | OZ |
| STATIC THRUST = | 1517.24 | POUND |
| STATIC THRUST = | 688.22 | KG |
| PERIMETER SPEED = | 303.07 | M/S |
| REQUIRED ENGINE POWER = | 136.078 HP = | 100.085 kW |
| ESTIMATED FLYING SPEED = | 34.0 MPH = | 29.5 KNOTS |

FIG. 13C

AIRCRAFT

RELATED APPLICATIONS

This application is a continuation of U.S. patent application Ser. No. 17/249,627 filed Mar. 8, 2021, and entitled "Aircraft," which is hereby incorporated by reference for all purposes.

BACKGROUND

A vertical take-off and landing (VTOL) aircraft can hover, take-off, and land vertically. This includes a variety of types of aircraft including fixed wing aircraft, helicopters, tiltrotors and other aircraft with powered rotors. It is known in the art that these types of aircrafts each have limitations. For example, the fixed wing aircraft trades the advantage of lift from the fixed wings for added weight. The traditional helicopter relies on the single, large propeller mounted on the top of the aircraft which lacks the benefit of lift from fixed wings. The tiltrotor typically has one or more powered rotors mounted at the ends of fixed wings and if one of the powered rotors malfunctions, the tiltrotor may crash because of the imbalance of the power from the fixed wings.

SUMMARY

An aircraft is disclosed and includes a fuselage extending along a longitudinal direction, and having a top surface opposite a bottom surface, a front section, a center section, and a rear section. A first mounting rod is coupled to the top surface of the fuselage and extends outwardly from opposite sides of the front section of the fuselage. A second mounting rod is coupled to the top surface of the fuselage and extends outwardly from opposite sides of the rear section of the fuselage. The first mounting rod and the second mounting rod are single rods. A first wing is opposite a second wing. The first and second wings are coupled to the center section of the fuselage, and the first and second wings extend outwardly from opposite sides of the center section of the fuselage. A plurality of power generator systems are included and each power generator system is coupled to the first mounting rod or the second mounting rod. Each power generator system includes a power source, a first propeller and a second propeller. The power source is configured to drive the first propeller and the second propeller. The first propeller and the second propeller have an axis of rotation, and are pivotable between a first position and a second position. The second position is perpendicular to the first position. A shroud has a shroud first end opposite a shroud second end, and encloses the power generator system.

An aircraft is disclosed and includes a first mounting rod coupled to a top surface of a fuselage and extending outwardly from opposite sides of a front section of the fuselage. A second mounting rod is coupled to the top surface of the fuselage and extends outwardly from opposite sides of a rear section of the fuselage. The first mounting rod and the second mounting rod are single rods. A plurality of power generator systems are included, and each power generator system is coupled to the first mounting rod or the second mounting rod. Each power generator system comprises a power source, a gearbox coupled to the power source. A first shaft is opposite a second shaft, and the first shaft and the second shaft extend outwardly from opposite sides of the gearbox. The first shaft is longitudinally spaced apart from the second shaft, and the first shaft is not in contact with the second shaft. A first propeller is coupled to the first shaft, and the first shaft is configured to transfer torque and rotation from the power source to the first propeller in a first direction. A second propeller is coupled to the second shaft, and the second shaft is configured to transfer torque and rotation from the power source to the second propeller in a second direction. The first direction and the second direction are different from one another. The first propeller and the second propeller have an axis of rotation, and are pivotable between a first position and a second position. The first position has the axis of rotation approximately horizontal and the second position has the axis of rotation approximately vertical.

BRIEF DESCRIPTION OF THE DRAWINGS

FIG. 8A is a perspective view of a T-design power generator system with rudders, in accordance with some embodiments.

FIG. 8B is a side view of a T-design power generator system with rudders, in accordance with some embodiments.

FIG. 8C is a perspective view of a direct drive design power generator system with rudders, in accordance with some embodiments.

FIG. 8D is a side view of a direct drive design power generator system with rudders, in accordance with some embodiments.

FIG. 13A is a table of a sample calculation for wing area of the aircraft, in accordance with some embodiments.

FIG. 13B is a table of a sample calculation for the lift of the aircraft, in accordance with some embodiments.

FIG. 13C is a table of sample calculations for the configuration of the aircraft, in accordance with some embodiments.

DETAILED DESCRIPTION

The aircraft is configured for vertical take-off and landing (VTOL) on land or water. The design includes fixed wings, a plurality of power generator sources and an amphibious landing gear system. The fixed wings and fuselage use a frame structure of lightweight materials that are low in RADAR detectability which contribute to a stealth nature of the aircraft. The fixed wings provide lift for the aircraft. The frame structure allows for easy expandability such as by adding a section to the fuselage thus increasing the overall length of the aircraft. The added section of fuselage may be useful for additional payload for cargo or weapons.

The power generator sources are located close to the fuselage of the aircraft as opposed to the ends of the fixed wings. In this way, the weight is distributed at the center of the aircraft enabling the aircraft to be stable and steady during operation such as during take-off, in flight and landing on land or water. The plurality of power generator systems provide redundancy in case of one power generator system malfunction or failure while producing the thrust for vertical take-off and landing. Each power generator system is independent from one another and additional power generator systems can be easily integrated for more power and thrust, enabling flexible scalable expansion and a safety feature.

Each power generator system includes counterrotating propellers such that a first propeller and a second propeller are pivotable between a first position and a second position, and the second position is perpendicular to the first position. For example, the first position may be a 0° horizontal position and the second position may be a 90° vertical position. This enables a high amount of maneuverability of the aircraft in roll, yoke and yaw directions while enabling vertical take-off and landing. Each power generator system includes a shroud which reduces noise, directs airflow thus increasing thrust, and prohibits a RADAR signal from being reflected to the source emitter.

The amphibious landing gear system allows the aircraft to land on the water, stay afloat on the water, then perform a vertical take-off from the water. The amphibious landing gear system includes a flap which assists the lifting force during take-off and has an aerodynamic profile for in-flight benefits.

The features of the aircraft include the capability of vertical take-off and landing on land or water, a large payload capacity, redundancy of the power generation systems, and the ease of expandability of the fuselage and power generator systems. These features allow the aircraft to be ideal for use in many sectors such as military operations, rescue missions and firefighter missions.

Figure 1:
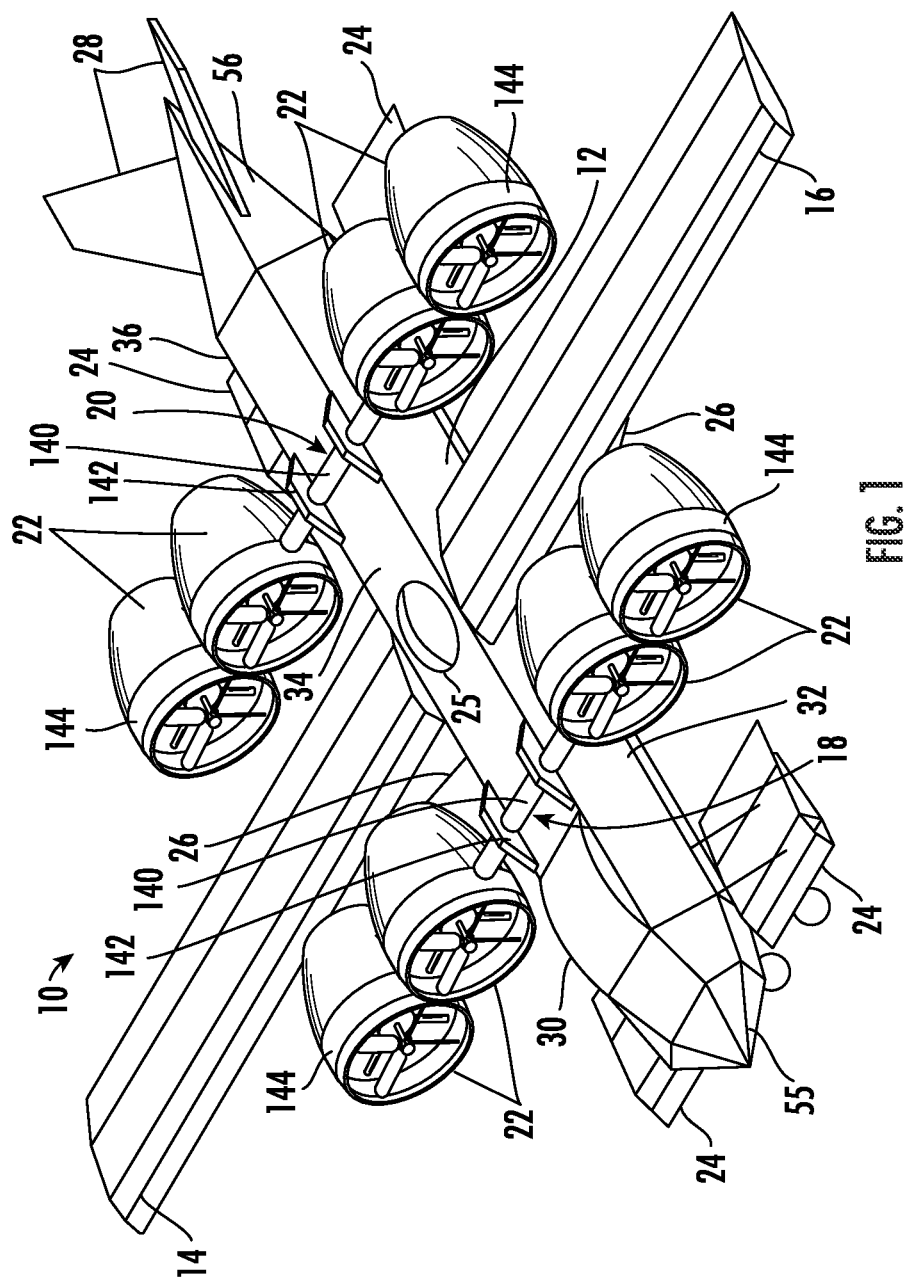
FIG. 1 is a perspective view of an aircraft, in accordance with some embodiments.
Figure 2A:
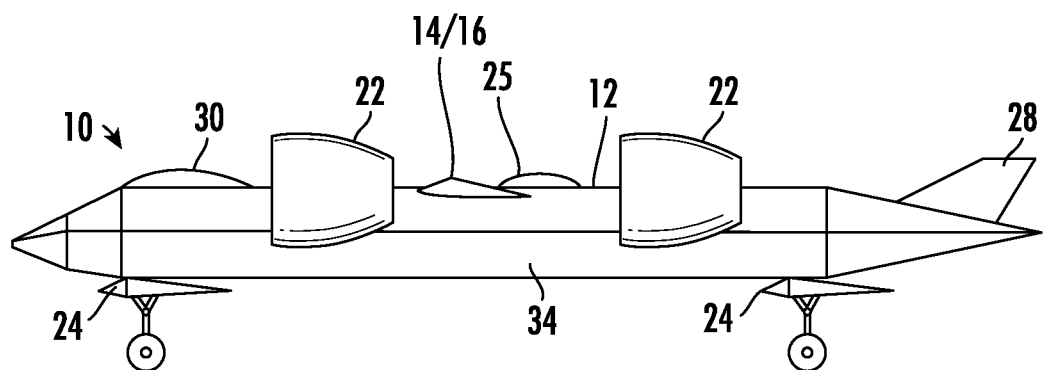
FIG. 2A is a side view of an aircraft, in accordance with some embodiments.
Figure 2B:
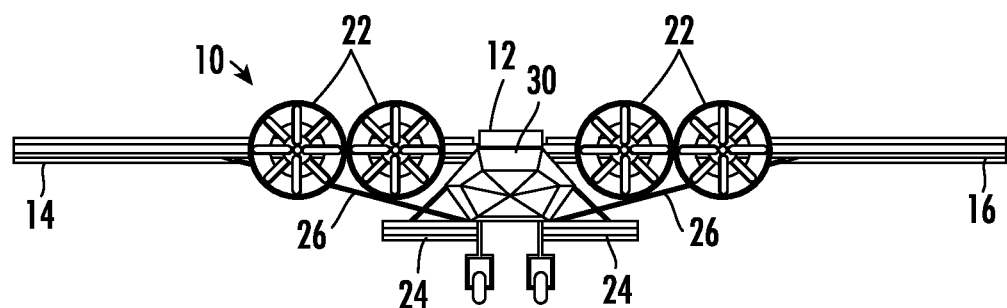
FIG. 2B is a front view of an aircraft, in accordance with some embodiments.
Figure 2C:
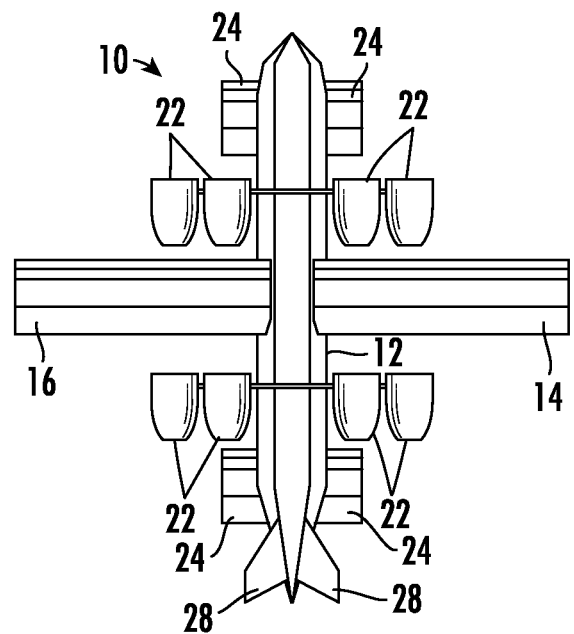
FIG. 2C is a top view of an aircraft, in accordance with some embodiments.
Figure 2D:
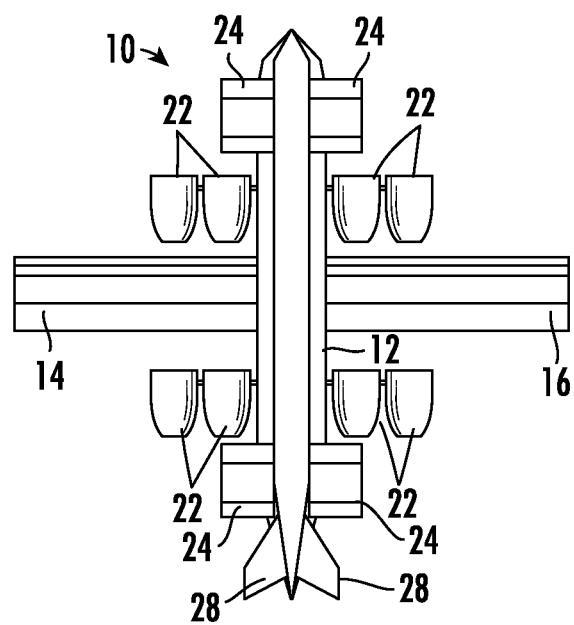
FIG. 2D is a bottom view of an aircraft, in accordance with some embodiments.

FIG. 1 is a perspective view of an aircraft, in accordance with some embodiments. The aircraft 10 includes a fuselage 12, first wing 14, second wing 16, first mounting member 18, second mounting member 20, plurality of power generator systems 22, amphibious landing gear system 24, parachute system 25 (also see FIG. 2A), plurality of wing braces 26, rear rudder 28, and cockpit 30. In accordance with some embodiments, FIG. 2A is a side view of an aircraft, FIG. 2B is a front view of an aircraft, FIG. 2C is a top view of an aircraft, and FIG. 2D is a bottom view of an aircraft. In an example embodiment, the aircraft 10 may have a wingspan of 65 feet, an overall length of 57 feet, and a height of 15 feet.

Figure 3A:
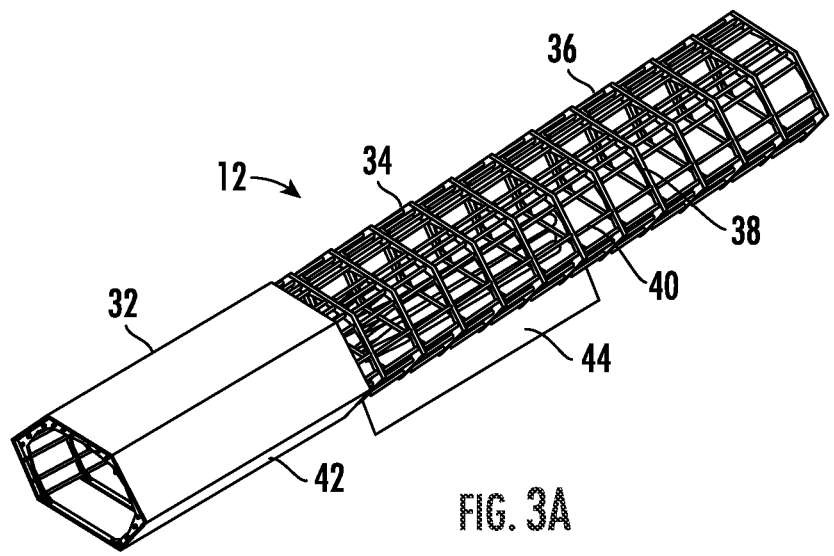
FIG. 3A is a perspective view of the fuselage of the aircraft, in accordance with some embodiments.
Figure 3B:
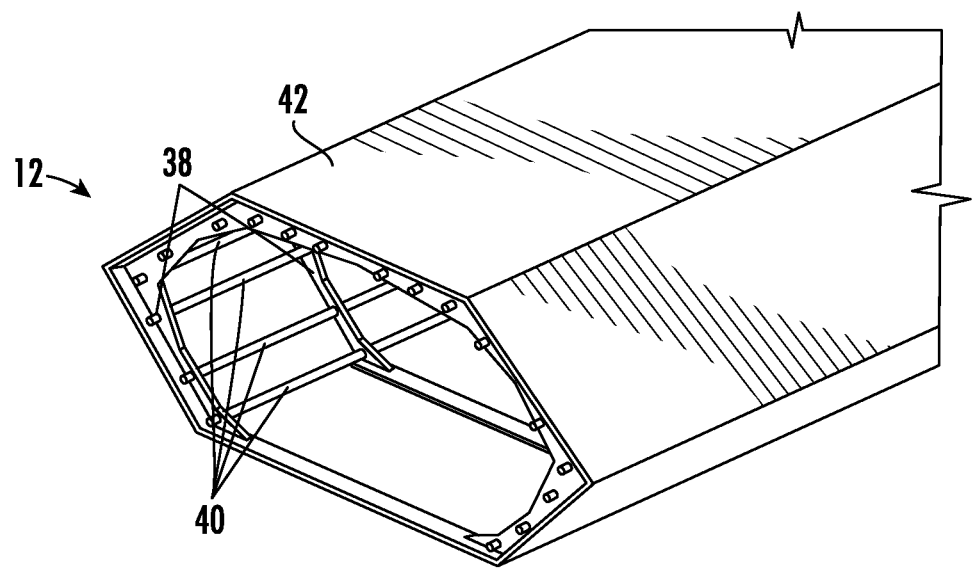
FIG. 3B is a close-up view of a front section of the fuselage shown in FIG. 3A, in accordance with some embodiments.

FIG. 3A is a perspective view of the fuselage 12 of the aircraft 10, in accordance with some embodiments, and FIG. 3B is a close-up view of a front section of the fuselage 12 shown in FIG. 3A, in accordance with some embodiments. The fuselage 12 has a front section 32, a center section 34, and a rear section 36, and is comprised of a frame structure of a plurality of structural elements forming a hexagonally-shaped cross-section, and a material covering the frame structure. For example, the frame structure includes a plurality of structural elements connected together such as a plurality of fuselage segments 38 coupled to a plurality of fuselage rods 40 thus forming a hexagonally-shaped cross-section for the fuselage 12. For example, the plurality of fuselage segments 38 form the cross-sectional shape, and the plurality of fuselage rods 40 connect the plurality of fuselage segments 38 and run longitudinally along the length of the fuselage 12. Other shapes for the cross-section for the fuselage 12 may be used such as a rhombus, oval, square, rectangular or the like. The plurality of fuselage segments 38 and the plurality of fuselage rods 40 may be comprised of a metal such as aluminum, carbon-fiber, or steel, or a composite material or combination thereof. In some embodiments, the plurality of fuselage segments 38 may be comprised of aluminum and the plurality of fuselage rods 40 may be comprised of carbon-fiber.

A fuselage cover 42, such as a neoprene skin or a lightweight polymer material, completely covers the frame structure. The combination of the plurality of fuselage segments 38 and the plurality of fuselage rods 40 enable the structure of the aircraft 10 to be strong and lightweight. The construction is a modular approach and allows for a flexible arrangement, ease of assembly and repair, and expandability such as by adding another section to the fuselage 12 (see FIG. 14) to increase the overall length of the aircraft for additional payload capacity. The fuselage cover 42 can be designed to provide a lightweight, flexible, ozone proof, waterproof and heat insulation material for protection of the fuselage 12. An access panel 44 located on the bottom side of the fuselage 12 provides access to the interior of the fuselage for cargo or weapons.

Figure 3C:
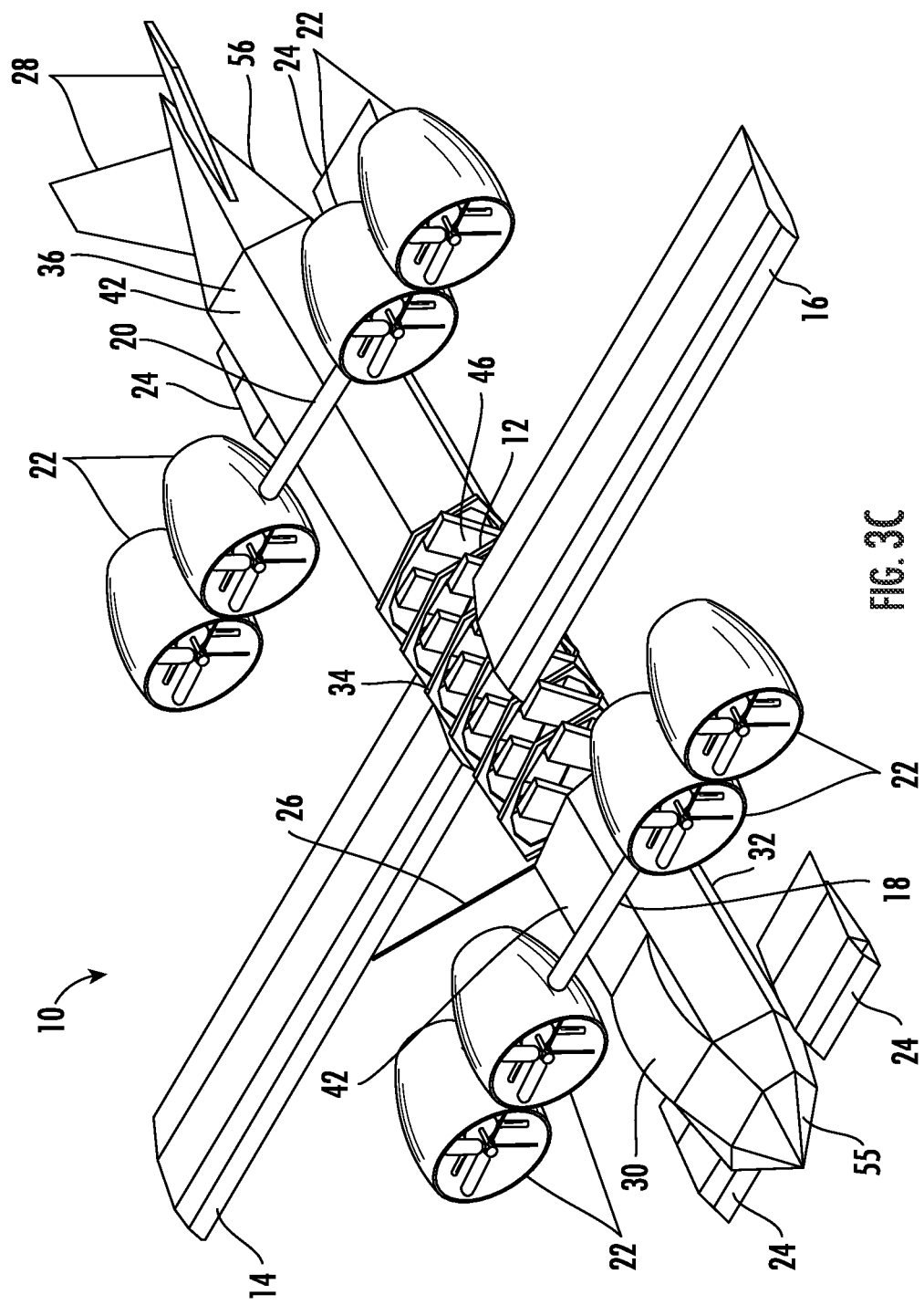
FIG. 3C is a perspective view of the aircraft with a portion of the fuselage cover removed, in accordance with some embodiments.

FIG. 3C is a perspective view of the aircraft 10 with a portion of the fuselage cover 42 removed, in accordance with some embodiments. In some embodiments, the aircraft 10 may be used for a commercial application to transport passengers or cargo. For example, a plurality of seats 46 may be located inside of the fuselage 12 such as between the first mounting member 18 and the second mounting member 20.

Referring to FIGS. 1 and 2B-2D, a first wing 14 is opposite a second wing 16. The first wing 14 and the second wing 16 are coupled to the center section 34 of the fuselage 12. The first wing 14 and the second wing 16 extend outwardly from opposite sides of the center section 34 of the fuselage 12. In some embodiments, the wingspan may be 60-70 feet such as 65 feet and the width (e.g., from the front to the back direction of the aircraft 10) of the first wing 14 and the second wing 16 may be 9 feet. A plurality of wing braces 26 couple the first wing 14 and the second wing 16 to the fuselage 12 for added rigidity and support of the first wing 14 and the second wing 16.

Figure 4A:
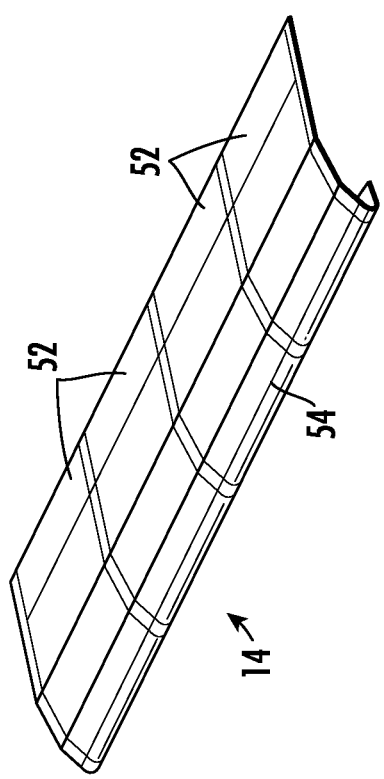
FIG. 4A is a perspective view of a portion of the first wing, in accordance with some embodiments.
Figure 4B:
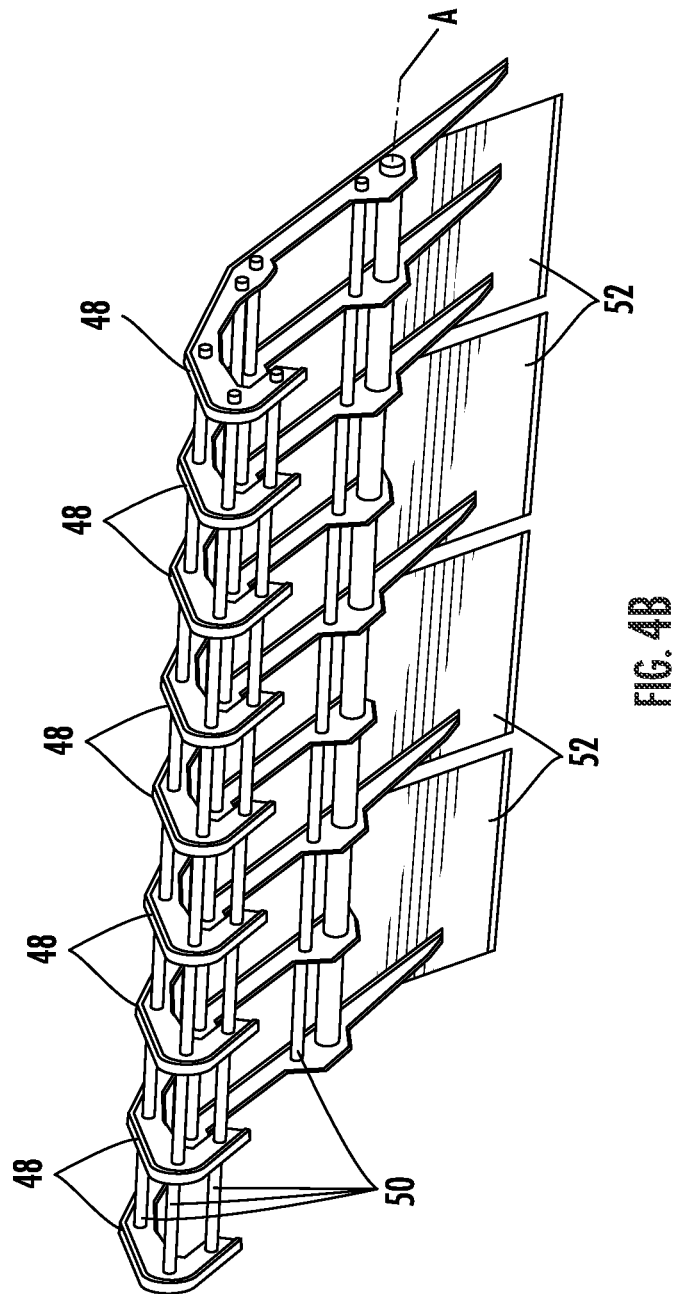
FIG. 4B is a cutaway view of a portion of the first wing, in accordance with some embodiments.

FIG. 4A is a perspective view of a portion of the first wing 14, in accordance with some embodiments, and FIG. 4B is a cutaway view of a portion of the first wing 14, in accordance with some embodiments. Similar to the fuselage design, the first wing 14 and the second wing 16 are comprised of a frame structure which includes a plurality of structural segments, such as a plurality of wing segments 48 and a plurality of wing rods 50 connected together. The plurality of wing segments 48 form the cross-sectional shape, and the plurality of wing rods 50 connect the plurality of wing segments 48 along the length of the wing. The plurality of wing segments 48 and the plurality of wing rods 50 may be comprised of a metal such as aluminum, carbon-fiber, or steel, or a composite material or combination thereof. Additionally, there are a plurality of pivotable wing extensions 52 positioned across the rear of the first wing 14 and the second wing 16 which may be pivoted about an axis A so that the angle of the plurality of pivotable wing extensions 52 along the wings can adjust the lifting force, or the Coefficient of Lift ($C_L$). For example, the wing extensions 52 can be designed to adjust the $C_L$ between 1.45 and 2.60. The cross-sectional shape of the first wing 14 and the second wing 16 may be an aerodynamic shape such as an airfoil. A wing cover 54, which may be similar to or the same as the fuselage cover 42, covers the frame structure of the first wing 14 and the second wing 16.

Referring to FIGS. 1 and 3C, the cockpit 30 is coupled to the front section 32 of the fuselage 12. In some embodiments, the aircraft 10 may be manned and in other embodiments the aircraft 10 may be unmanned. A nose 55 is coupled to the cockpit 30 and a tail 56 is coupled to the rear section 36 of the fuselage 12. The tail 56 has a rear rudder 28 to enable stability during flight. The aircraft 10 may include antennas and communication to broadband satellite communications. Passive RADAR sensors may be coupled to various components of the aircraft 10 such as the cockpit 30, the first wing 14, the second wing 16, and the fuselage 12 to detect adversary active RADAR signals from various directions.

Referring to FIG. 1, a first mounting member 18 is coupled to the front section 32 of the fuselage 12 and extends outwardly from opposite sides of the front section 32 of the fuselage 12. A second mounting member 20 is coupled to the rear section 36 of the fuselage 12 and extends outwardly from opposite sides of the rear section 36 of the fuselage 12. The first mounting member 18 and the second mounting member 20 are coupled to the fuselage 12 near a top portion of the fuselage 12. The first mounting member 18 and the second mounting member 20 each include a mounting rod 140, brackets 142 and straps 144. The mounting rod 140 is positioned perpendicular to the length of the fuselage 12, and the brackets 142, such as two brackets 142, are coupled to the top surface of the fuselage 12 to secure the mounting rod 140. Each strap 144 is coupled to the mounting rod 140 and a power generator system 22 of the plurality of power generator systems 22. The first mounting member 18 and the second mounting member 20 secures the plurality of power generator systems 22 in position.

The aircraft includes a plurality of power generator systems 22. Each power generator system 22 is coupled to the first mounting member 18 or the second mounting member 20. For example, there may be two power generator systems 22 coupled to the first mounting member 18 and located on a first side of the fuselage 12, and two power generator systems 22 coupled to the first mounting member 18 and located on a second side of the fuselage 12. The first side of the of the fuselage 12 may be laterally opposite the second side of the fuselage 12. Likewise, there may be two power generator systems 22 coupled to the second mounting member 20 and located on the first side of the fuselage 12, and two power generator systems 22 coupled to the second mounting member 20 and located on the second side of the fuselage 12. The power generator systems 22 are located near the fuselage 12 as opposed to near the end of the first wing 14 or second wing 16 as in conventional aircraft. For example, the gap between the closest power generator system 22 and the fuselage 12 may be 5-20 inches or in some embodiments, 10 inches. Positioning the power generator systems 22 closer to the center of gravity as opposed to at the end of the wings, and having a symmetrical configuration of the power generator systems 22 between the first side of the fuselage 12 and the second side of the fuselage 12, provides better stability in the maneuverability of the aircraft 10 during take-off, in-flight and landing.

The total amount of power generator systems 22 may be eight. In other embodiments, there may be any number of power generator system 22 mounted on first side of the fuselage 12 or the second side of the fuselage 12. For example, there may be 2-10 power generator systems 22 mounted to the first mounting member 18, with an equal number on each side of the fuselage 12, and 2-8 power generator systems 22 mounted to the second mounting member 20, with an equal number on each side of the fuselage 12, for a total of 4-20 power generator systems 22. In other embodiments, there may be more or less power generator systems 22 mounted to the first mounting member 18 than the second mounting member 20.

Figure 5A:
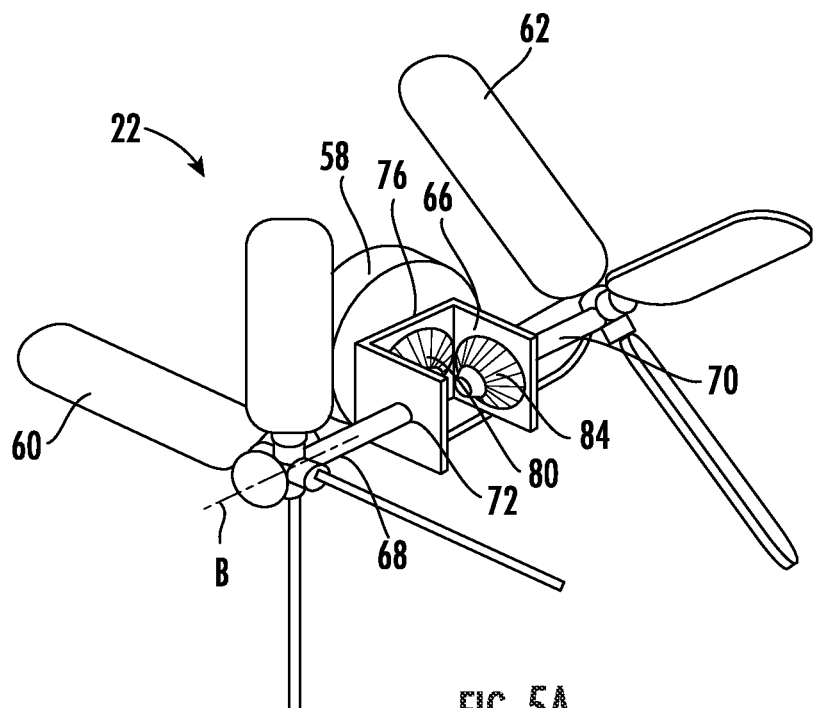
FIG. 5A is a perspective view of the power generator system, in accordance with some embodiments.
Figure 5B:
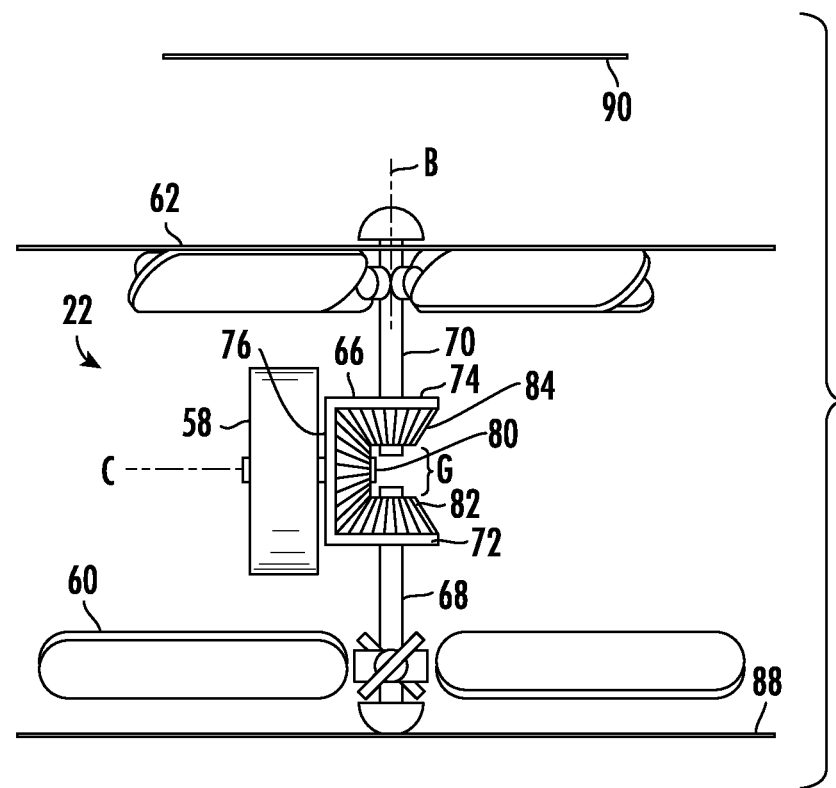
FIG. 5B is a top view of the power generator system, in accordance with some embodiments.
Figure 5C:
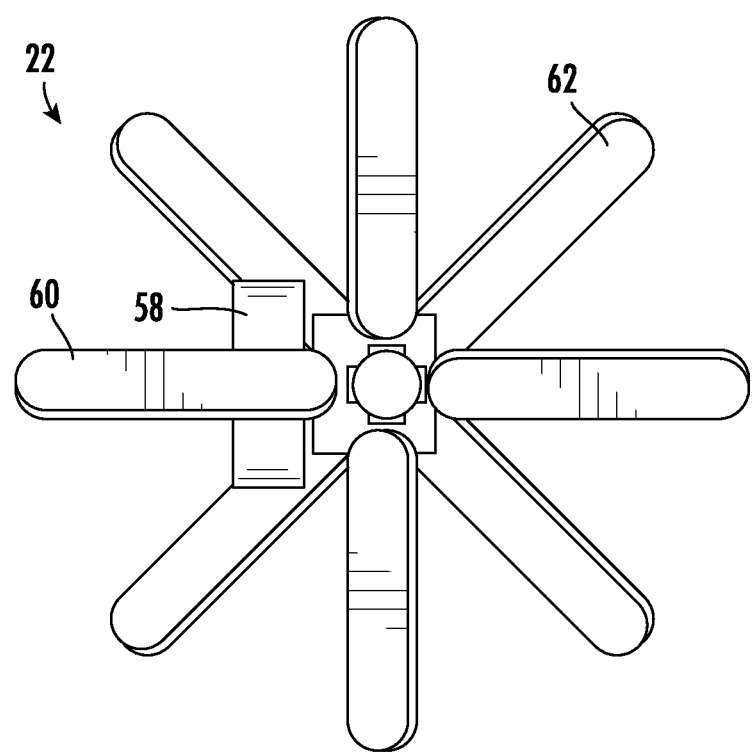
FIG. 5C is a front view of the power generator system, in accordance with some embodiments.

In accordance with some embodiments, FIG. 5A is a perspective view of the power generator system 22, FIG. 5B is a top view of the power generator system 22, and FIG. 5C is a front view of the power generator system 22. Each power generator system 22 includes a power source 58, a first propeller 60, a second propeller 62 and a shroud 64 (see FIGS. 6A-6D). The power source 58 is configured to drive the first propeller 60 and the second propeller 62. The first propeller 60 and the second propeller 62 have an axis of rotation B so that the first propeller 60 and the second propeller 62 rotate about axis B. The first propeller 60 and the second propeller 62 are comprised of a plurality of blades. In some embodiments, the number of blades of the first propeller 60 is the same as or greater than the number of blades of the second propeller 62. In some embodiments, a diameter of the second propeller 62 is less than a diameter of the first propeller 60. For example, the diameter of the first propeller 60 may be 70-80 inches and the diameter of the second propeller 62 may be 50-78 inches. The diameter of the second propeller being less than the diameter of the first propeller 60 may reduce the tip speed or the loading of the blades which decreases the noise.

Each power generator system 22 includes a gearbox 66 coupled to the power source 58. The gearbox 66 may be a counterrotating gearbox 66 with, in some embodiments, a T-style design, meaning the output shafts—the first shaft 68 and the second shaft 70—are on the same axis as one another while the input shaft is coupled to the power source 58 at 90° to both output shafts. In other embodiments, the counterrotating gearbox 66 may be a direct drive design meaning the output shafts and the input shaft are on the same axis, and the power source 58 is directly coupled to one of the output shafts thereby driving one of the propellers. By using counterrotating propellers, the torque of the first propeller 60 effectively cancels out the torque of the second propeller 62. This increases the speed of airflow accelerated by the propellers, thus increasing the efficiency at relatively high travelling speeds of the aircraft. Counterrotating propellers increase the thrust thus improving the payload capacity and are 6-16% more efficient than conventional propeller designs. In conventional propeller designs, the propeller can only be operated effectively at low Mach speeds and increasing the RPMs above a certain point causes the airflow rearward of the propeller to compress but not accelerate. In counterrotating propeller designs, the second propeller 62 rotates inside the airflow generated by the first propeller 60 thus generating increased airflow without the compression.

A first shaft 68 is opposite a second shaft 70, and the first propeller 60 is opposite the second propeller 62. The first shaft 68 and the first propeller 60 extend outwardly from a first side 72 of the gearbox 66 and the second shaft 70 and the second propeller 62 extend outwardly from a second side 74 of the gearbox 66 opposite the first side 72 of the gearbox 66. The first shaft 68 is longitudinally spaced apart from the second shaft 70, so that there is a gap G between the first shaft 68 and second shaft 70. In other words, the first shaft 68 is not in contact with the second shaft 70. In some embodiments such as the T-style design and as shown in FIGS. 5A-5C, the power source 58 is on a third side 76 of the gearbox 66. The third side 76 of the gearbox 66 is parallel to the axis of rotation B of the first propeller 60 and the second propeller 62, and the axis of rotation C of the shaft of the power source 58 is perpendicular to the axis of rotation B of the first propeller 60 and the second propeller 62. Hence, the axis of rotation C of the shaft of the power source 58 is 90° to the first shaft 68 and 90° to the second shaft 70.

The first propeller 60 is coupled to the first shaft 68, and the first shaft 68 is configured to transfer torque and rotation from the power source 58 to the first propeller 60 in a first direction such as a clockwise direction. The second propeller 62 is coupled to the second shaft 70, and the second shaft 70 is configured to transfer torque and rotation from the power source 58 to the second propeller 62 in a second direction such as counterclockwise. The first direction and the second direction are different from one another.

In some embodiments, the gearbox 66 includes a first bevel gear 80 attached to the third side 76 of the gearbox 66 and coupled to the power source 58. A second bevel gear 82 on the first side 72 of the gearbox 66 engages with the first bevel gear 80 and the first shaft 68 to enable rotation of the first propeller 60 in the first direction. A third bevel gear 84 on the second side 74 of the gearbox 66 is spaced apart from the second bevel gear 82, and engages with the first bevel gear 80 and the second shaft 70 to enable rotation of the second propeller 62 in the second direction.

Figure 6A:
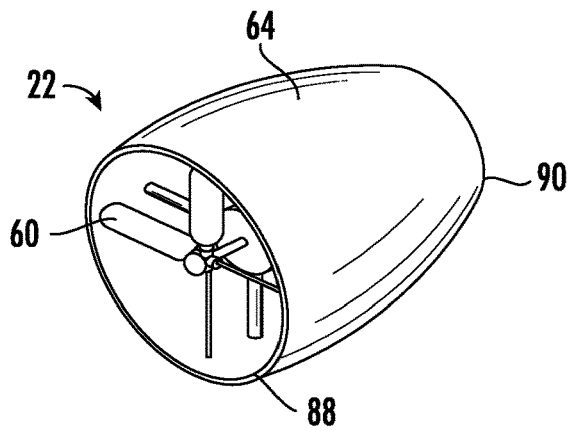
FIG. 6A is a perspective view of the shroud of the power generator system, in accordance with some embodiments.
Figure 6B:
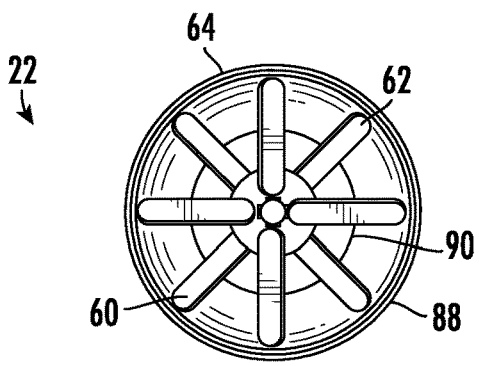
FIG. 6B is a front view of the shroud of the power generator system, in accordance with some embodiments.
Figure 6C:
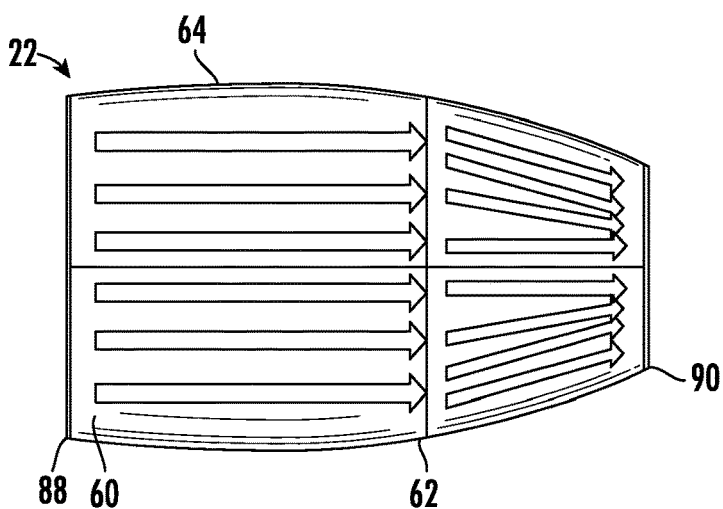
FIG. 6C is a side view of the shroud of the power generator system, in accordance with some embodiments.
Figure 6D:
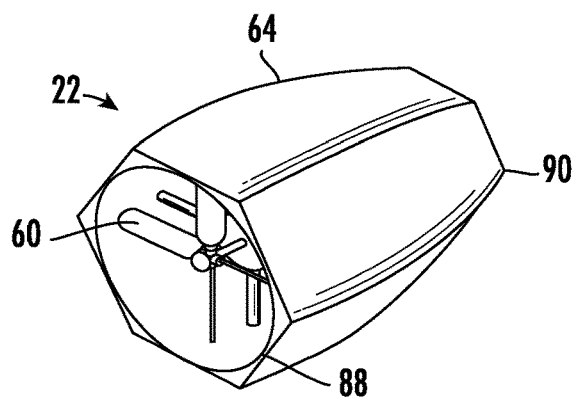
FIG. 6D is a perspective view of the shroud of the power generator system, in accordance with some embodiments.

In accordance with some embodiments, FIG. 6A is a perspective view of the shroud 64 of the power generator system 22, FIG. 6B is a front view of the shroud 64 of the power generator system 22, and FIG. 6C is a side view of the shroud 64 of the power generator system 22. The shroud 64 has a shroud first end 88 opposite a shroud second end 90, and covers or encloses the power generator system 22. The shroud 64 reduces noise from the power generator system 22, protects people, animals or objects from the rotating propellers, prohibits a RADAR signal from being reflected to the source emitter, and increases thrust of the aircraft deflecting or guiding airflow to improve the aerodynamic effect. FIG. 6C depicts arrows indicating the direction of airflow. The cross-section of the shroud 64 may be circular, oval, hexagonal, or the like. FIG. 6D is a perspective view of the shroud 64 of the power generator system 22, in accordance with some embodiments. In this example, the cross-section of the shroud 64 is hexagonal. For example, the shroud 64 is sized to cover the first propeller 60 and the second propeller 62. The distance between the first propeller 60 and the second propeller 62 may be 60-80 inches. A longer distance between the first propeller 60 and the second propeller 62 increases the efficiency of the counterrotating power source design. The length of the shroud 64 may be 110-120 inches. A diameter of the shroud first end 88 is sized to be slightly larger than the diameter of the first propeller 60. In some embodiments, the diameter of the shroud first end 88 is 65-85 inches. The length of the shroud may then taper to a diameter of the shroud second end 90. The diameter of the shroud second end 90 may be 25-45 inches.

Figure 7A:
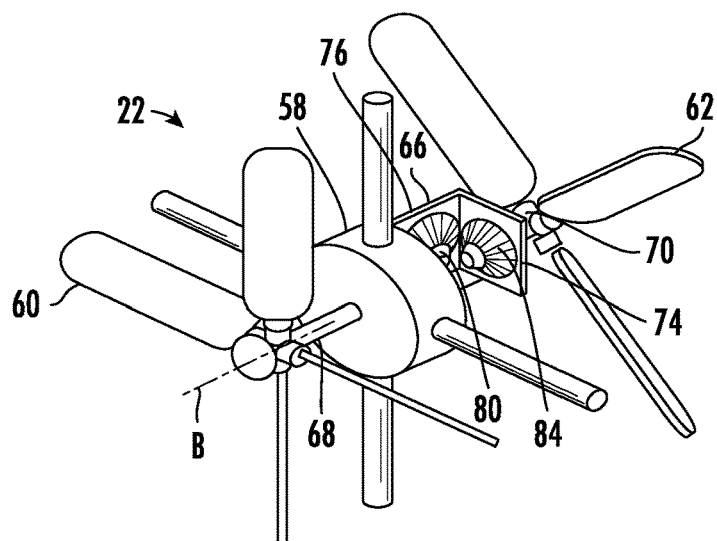
FIG. 7A is a perspective view of the power generator system, in accordance with some embodiments.
Figure 7B:
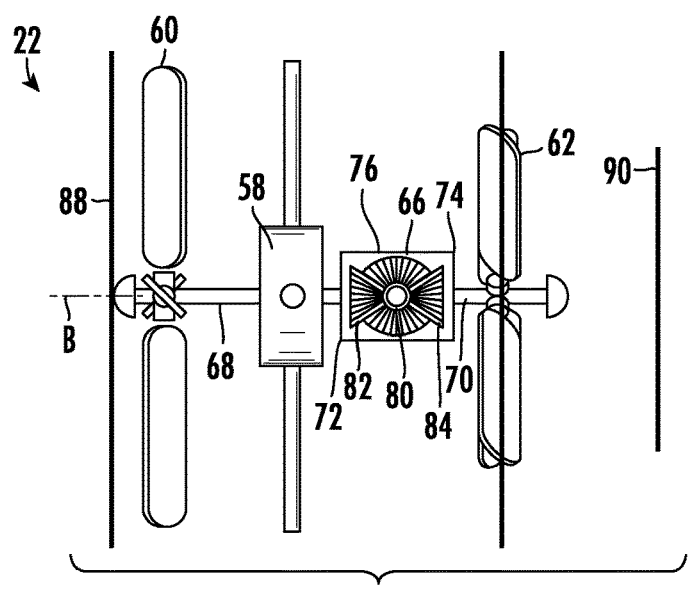
FIG. 7B is a side view of the power generator system, in accordance with some embodiments.
Figure 7C:
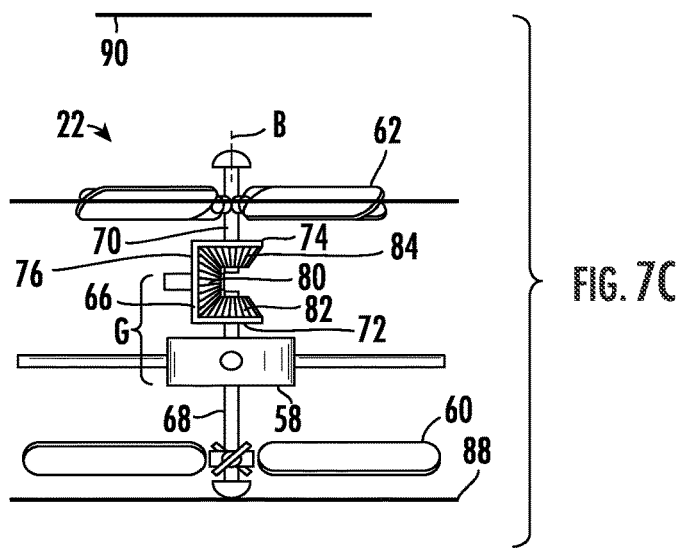
FIG. 7C is a top view of the power generator system, in accordance with some embodiments.

In other embodiments, the counterrotating gearbox 66 may be a direct drive design. In accordance with some embodiments, FIG. 7A is a perspective view of the power generator system 22, FIG. 7B is a side view of the power generator system 22, and FIG. 7C is a top view of the power generator system 22. The power source 58 is positioned between the first side 72 of the gearbox 66 and the first shaft 68, and on the same axis of rotation as the first propeller 60 and the second propeller 62. The gearbox 66 includes the first bevel gear 80 attached to the third side 76 of the gearbox 66. The second bevel gear 82 on the first side 72 of the gearbox 66 engages with the first bevel gear 80 and the power source 58. The power source 58 engages with the first shaft 68 to enable rotation of the first propeller 60 in the first direction such as in a clockwise direction. The third bevel gear 84 on the second side 74 of the gearbox 66 is spaced apart from the second bevel gear 82, and engages with the first bevel gear 80 and the second shaft 70 to enable rotation of the second propeller 62 in the second direction such as counterclockwise.

In accordance with some embodiments, FIG. 8A is a perspective view of a T-design power generator system 22 with rudders, FIG. 8B is a side view of a T-design power generator system 22 with rudders, FIG. 8C is a perspective view of a direct drive design power generator system 22 with rudders, and FIG. 8D is a side view of a direct drive design power generator system 22 with rudders. A first rudder 92 is positioned between the first propeller 60 and the second propeller 62, and is coupled to the first shaft 68. A second rudder 94 is positioned between the second propeller 62 and the shroud second end 90, and is coupled to the second shaft 70. The first rudder 92 and the second rudder 94 have the same axis of rotation as the first propeller 60 and the second propeller 62. The first shaft 68 is configured to transfer torque and rotation from the power source 58 to the first rudder 92 in a first direction such as a clockwise direction, and the second rudder 94 is configured to transfer torque and rotation from the power source 58 to the second rudder 94 in a second direction such as counterclockwise. The first direction and the second direction are different from one another. The position of the first rudder 92 and the second rudder 94 such as behind the first propeller 60 and the second propeller 62 respectively, forces or guides the airflow in the direction of the thrust such as along the axis of rotation thus increasing the thrust. The first rudder 92 and the second rudder 94 also reinforce the structure of the power generator system 22 in the shroud 64. The power generator system 22 design with the rudders may also be used in other applications such in a boat or ship power generator system.

Figure 9:
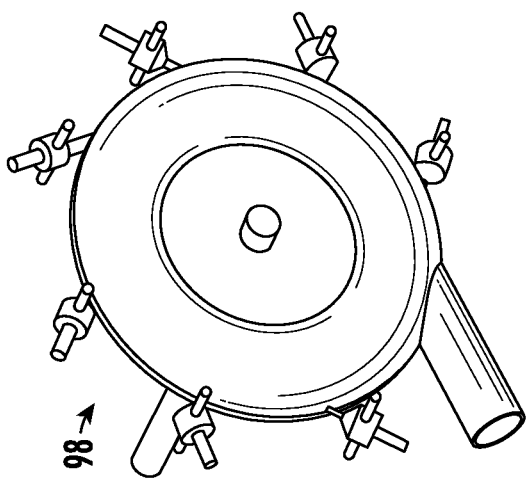
FIG. 9 is a perspective view of a turbine engine system, in accordance with some embodiments.

Each power generator system 22 includes at least one power source 58. The power source 58 may be any type of engine or motor such as a gas engine, diesel engine, battery-powered engine, axial flux motor 96 (see FIG. 10), turbine engine system 98 or combination thereof. A turbine engine system is disclosed in Jeng, U.S. patent application Ser. No. 17/067,143, entitled "Turbine Engine System" filed on Oct. 9, 2020, which is owned by the assignee of the present application and is hereby incorporated by reference. FIG. 9 is a perspective view of a turbine engine system 98, in accordance with some embodiments. In some embodiments, the power source 58 is the turbine engine system 98 coupled to the gearbox 66 and enclosed by the shroud 64. In some embodiments, the power source 58 is a combination of a first axial flux motor 96, a second axial flux motor 96 and the turbine engine system 98.

Figure 10:
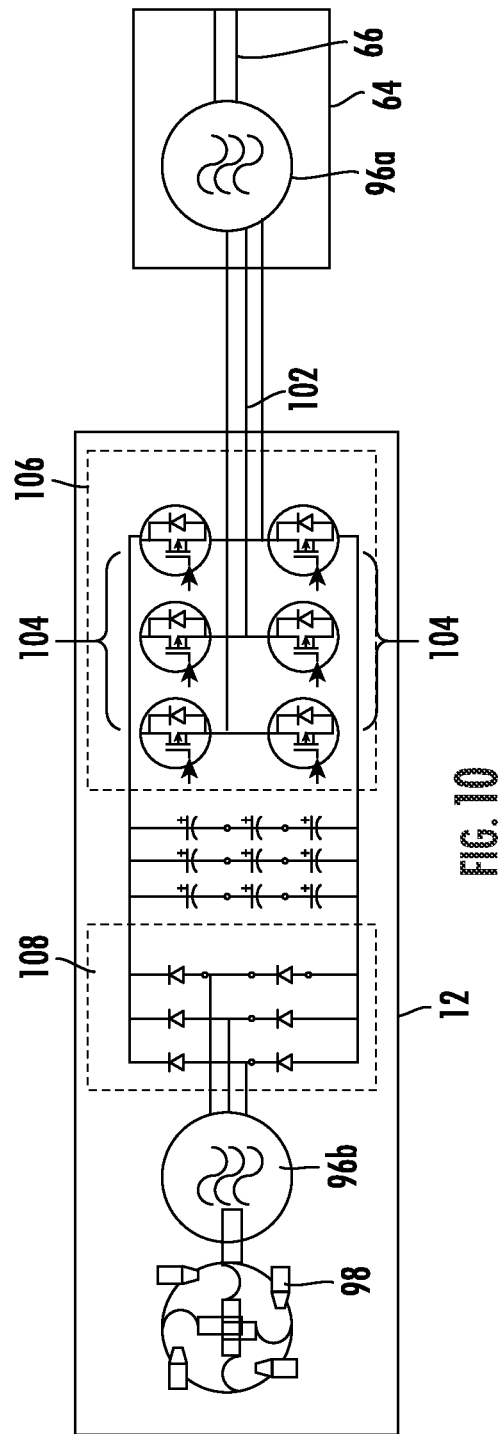
FIG. 10 is a schematic of a combination of power sources for the aircraft, in accordance with some embodiments.

FIG. 10 is a schematic of a combination of power sources for the aircraft 10, in accordance with some embodiments. For example, the first axial flux motor 96a is coupled to the gearbox 66 and located within the shroud 64. A plurality of wires 102 connect the first axial flux motor 96a to the second axial flux motor 96b and the turbine engine system 98, which are located inside of the fuselage 12 near the first mounting member 18 and/or the second mounting member 20. The second axial flux motor 96b and the turbine engine system 98 generate an electrical signal (e.g., 720V DC/200 KW) and various components such as insulated-gate bipolar transistors (IGBT) 104, DC-AC inverters 106 and AC-DC rectifiers 108 may be used to modify the electrical signal between the turbine engine system 98 and axial flux motors 96a and 96b. Fuel tanks located inside the fuselage 12 may store fuel for the power source 58.

Figure 11A:
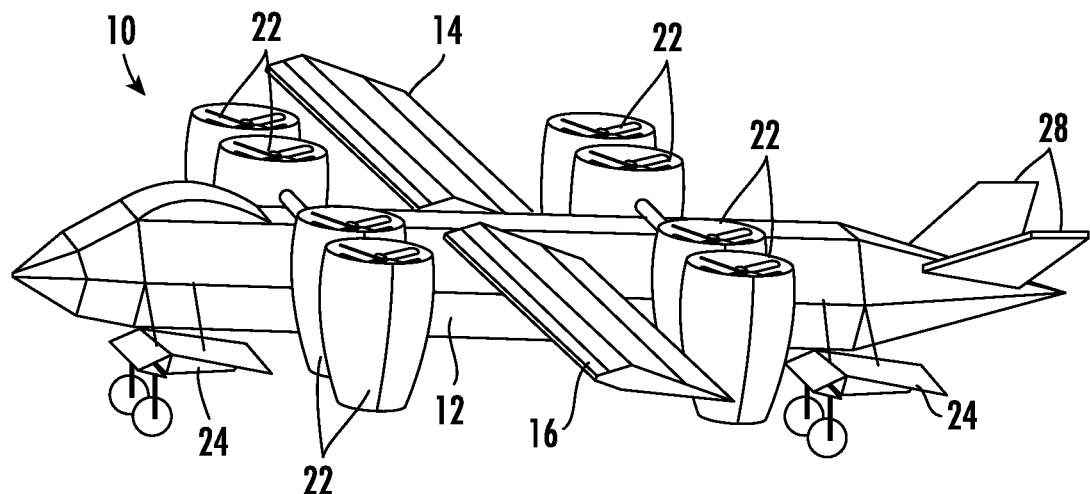
FIGS. 11A and 11B are perspective views of the aircraft, in accordance with some embodiments.
Figure 11B:
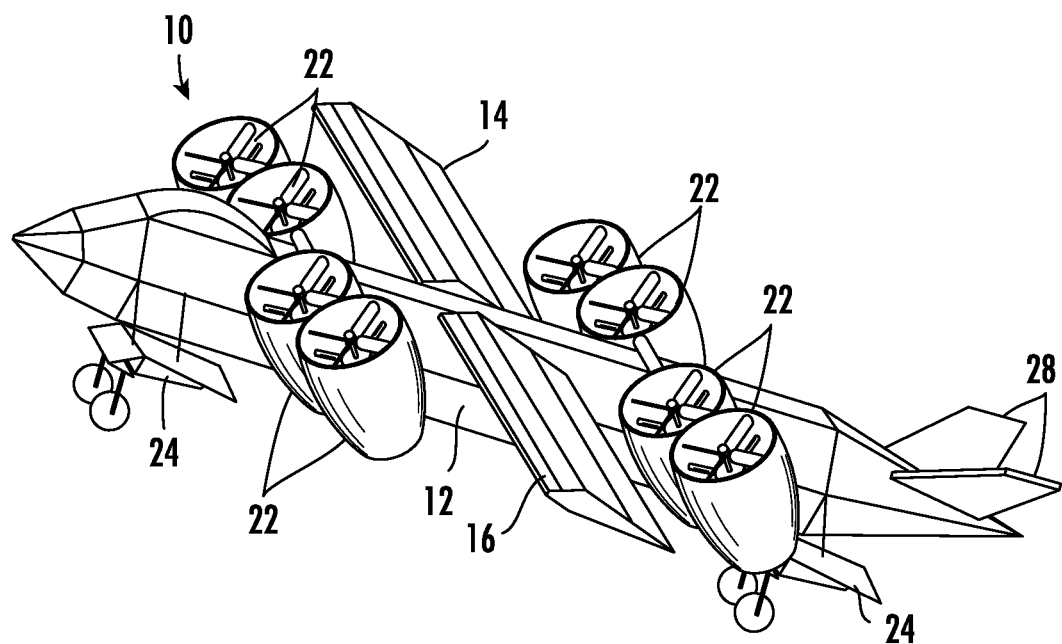

Each power generator system 22 is controlled independently from one another. For each power generator system 22, the first propeller 60 and the second propeller 62 are pivotable between a first position and a second position, and the second position is perpendicular to the first position. For example, the first position may have a first position axis of rotation approximately horizontal, and the second position may have a second position axis of rotation approximately vertical. In this way, the first position may be a 0° horizontal position and the second position may be a 90° vertical position. Referring to FIGS. 1 and 2A-2D, the first propeller 60 and the second propeller 62 are illustrated in a first position such as 0° horizontal position. FIGS. 11A and 11B are perspective views of the aircraft, in accordance with some embodiments. FIG. 11A shows the aircraft 10 with the first propeller 60 and the second propeller 62 of each power generator system 22 in the second position where the second position is perpendicular to the first position such as at 90°. This configuration may be used during a vertical take-off or landing. FIG. 11B shows the aircraft 10 ascending with the first propeller 60 and the second propeller 62 of each power generator system 22 in another position, such as the first propeller 60 and the second propeller 62 of each power generator system 22 at angle between the first position and the second position such as at 40-50° or 45°. This adjustability in orientation of the power generator systems 22 enables a high amount of maneuverability of the aircraft in roll, yoke and yaw directions while enabling vertical take-off and landing.

Figure 12A:
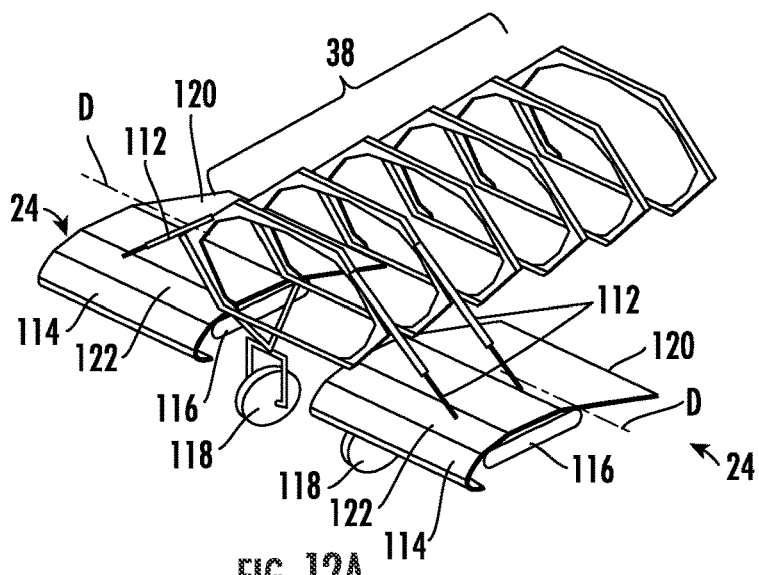
FIG. 12A is a perspective view of an amphibious landing gear system, in accordance with some embodiments.

The aircraft 10 can vertically take-off or land on land or water. This may be suitable for aircraft carriers to execute missions. FIG. 12A is a perspective view of an amphibious landing gear system 24, in accordance with some embodiments. The amphibious landing gear system 24 is coupled to an underside of the fuselage 12 (shown as plurality of fuselage segments 38 for clarity), such as to the underside of the front section 32 of the fuselage 12 and the rear section 36 of the fuselage 12. A plurality of hydraulic pistons 112 or other spring-like devices may be used to couple the amphibious landing gear system 24 to the fuselage 12 to help absorb the impact when landing. The amphibious landing gear system 24 includes an aerodynamically-shaped flap 114, a bladder 116 and a wheel 118. Similar to the fuselage 12 design, and the first wing 14 and the second wing 16 designs, the aerodynamically-shaped flap 114 is comprised of a frame structure which includes a plurality of structural segments, such as a plurality of flap segments and a plurality of flap rods connected together (not shown). The plurality of flap segments and the plurality of flap rods may be comprised of a metal such as aluminum, carbon-fiber, or steel, or a composite material or combination thereof. Additionally, there is a pivotable flap extension 120 positioned across the rear of the flap 114 which may be pivoted about an axis D so that the angle of the plurality of pivotable flap extensions 120 along the flap 114 can adjust the lifting force. The cross-sectional shape of the flap 114 may be an airfoil. A flap cover 122, which may be similar to or the same as the fuselage cover 42 and wing cover 54, covers the flap 114.

Figure 12B:
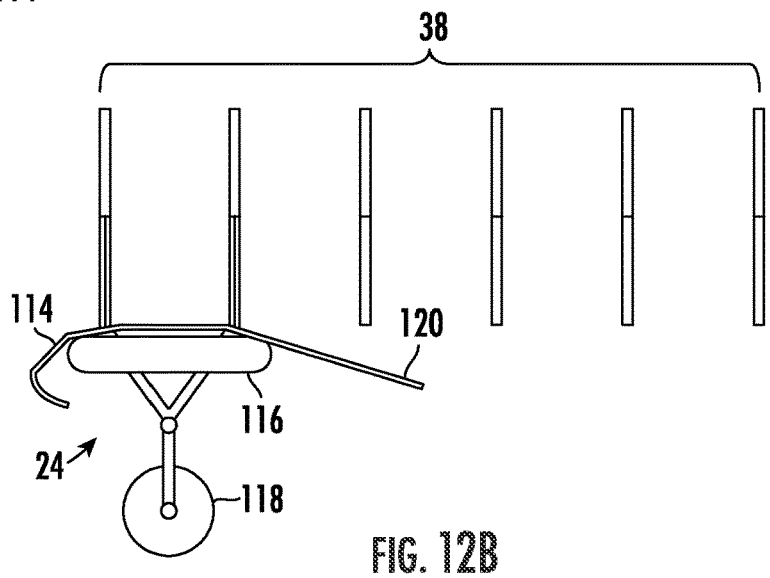
FIG. 12B is a side view of an amphibious landing gear system during flight, in accordance with some embodiments.
Figure 12C:
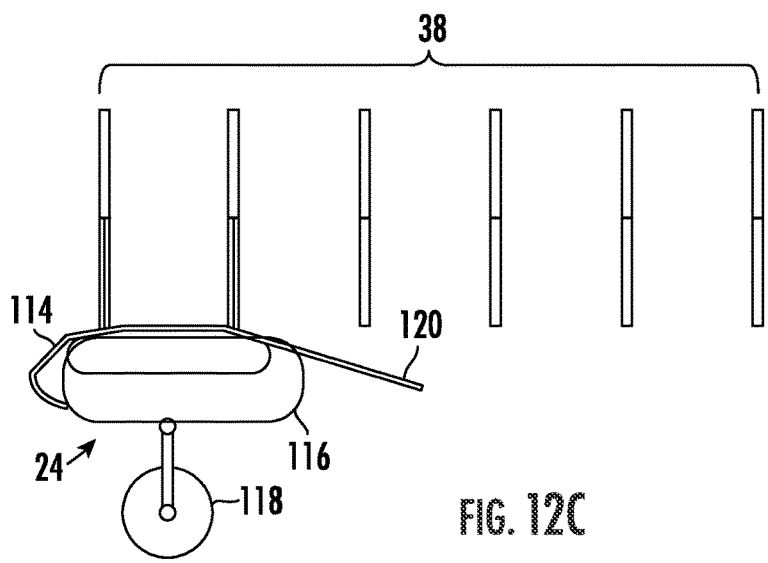
FIG. 12C is a side view of an amphibious landing gear system during landing, in accordance with some embodiments.

FIG. 12B is a side view of an amphibious landing gear system 24 during flight, in accordance with some embodiments, and FIG. 12C is a side view of an amphibious landing gear system 24 during landing, in accordance with some embodiments. The bladder 116 is located under the flap 114, and is configured to inflate and deflate. During flight, the bladder 116 may be in a deflated mode and tucked away under the flap 114 or hidden by the flap 114 to avoid drag, thus enabling an aerodynamic profile. During landing or take-off, the bladder 116 may be in an inflated mode. Hence, the bladder 116 is sized to provide buoyancy for the aircraft 10 when inflated such as when landing or taking off from water. The deflation and inflation may be accomplished using a high-pressure air tank. The flap 114 with the pivotable flap extension 120 provide additional lift power during take-off. When the bladder 116 is inflated, the aircraft 10 can land on water and stay afloat, such as park on the water, as long as the bladder 116 is inflated. Because the aircraft can stay afloat on the water, this enables the aircraft 10 to vertically take-off from this position on the water. The wheel 118 is provided for take-off or landing on land.

In some embodiments, the aircraft 10 includes a second amphibious landing gear system 24 which is the same description as the amphibious landing gear system 24 described herein. As seen in FIGS. 1, 2A-2D, 3C, and 11A-11B, the amphibious landing gear system 24 is coupled to the front section 32 of the fuselage 12 and the second amphibious landing gear system 24 is coupled to the rear section 36 of the fuselage 12.

Referring to FIGS. 1 and 2A, the aircraft 10 may include a parachute system 25 in the center section 34 of the fuselage 12. The parachute system 25 may be deployed in an emergency situation so that people on the aircraft 10 may bailout and the aircraft 10 can be recovered. The parachute system 25 may stored in the fuselage 12 and positioned to deploy through a door (not shown) on the topside of the center section 34 of the fuselage 12. The parachute system 25 is sized to support a weight of the aircraft 10. In some embodiments, the parachute system 25 may be deployed when landing to conserve fuel for cost benefits. The ability to have the parachute system 25 that can carry the weight of the entire aircraft 10 is possible due to the lightweight design of the aircraft 10.

FIG. 13A is a table of a sample calculation for wing area of the aircraft 10, in accordance with some embodiments. For example, in Table 1, the wing area may be calculated in order to calculate the lift of the aircraft 10. The fixed wings, such as the first wing 14 and the second wing 16 may have a length of 30 feet and a width of 9 feet. The flap of the landing gear may have a length of 10 feet and a width of 9 feet. Therefore the total wing area may be 900 ft². FIG. 13B is a table of a sample calculation for the lift of the aircraft 10, in accordance with some embodiments. For example, in Table 2, the lift is calculated from the given formula as about 11,000 kg.

FIG. 13C is a table of sample calculations for the configuration of the aircraft 10, in accordance with some embodiments. For example, in Table 3, when the diameter of the first propeller 60 and the diameter of the second propeller 62 are 76 inches, the number of blades of the first propeller 60 and the second propeller 62 are four with the pitch of 12 inches (e.g, the pitch is the distance the propeller would move in one revolution if it were moving through a soft solid), the RPMs of the first propeller 60 and the second propeller 62 are 3000, the static thrust can be calculated. In this example, for the aircraft 10, this configuration generates a static thrust of 688.22 kg per propeller of 1376.44 kg of thrust per power generator system 22 since each power generator system 22 has two propellers. Since there are sixteen propellers, the maximum flying speed is 34 mph× 16=544 mph. In one configuration, the aircraft 10 has a wingspan of 65 feet, a length of 57 feet and a height of 15 feet. The maximum takeoff is 11,000 kg, the payload is 5,000 kg, the maximum speed is 544 mph, the range of flight is 1,000 km.

Figure 14:
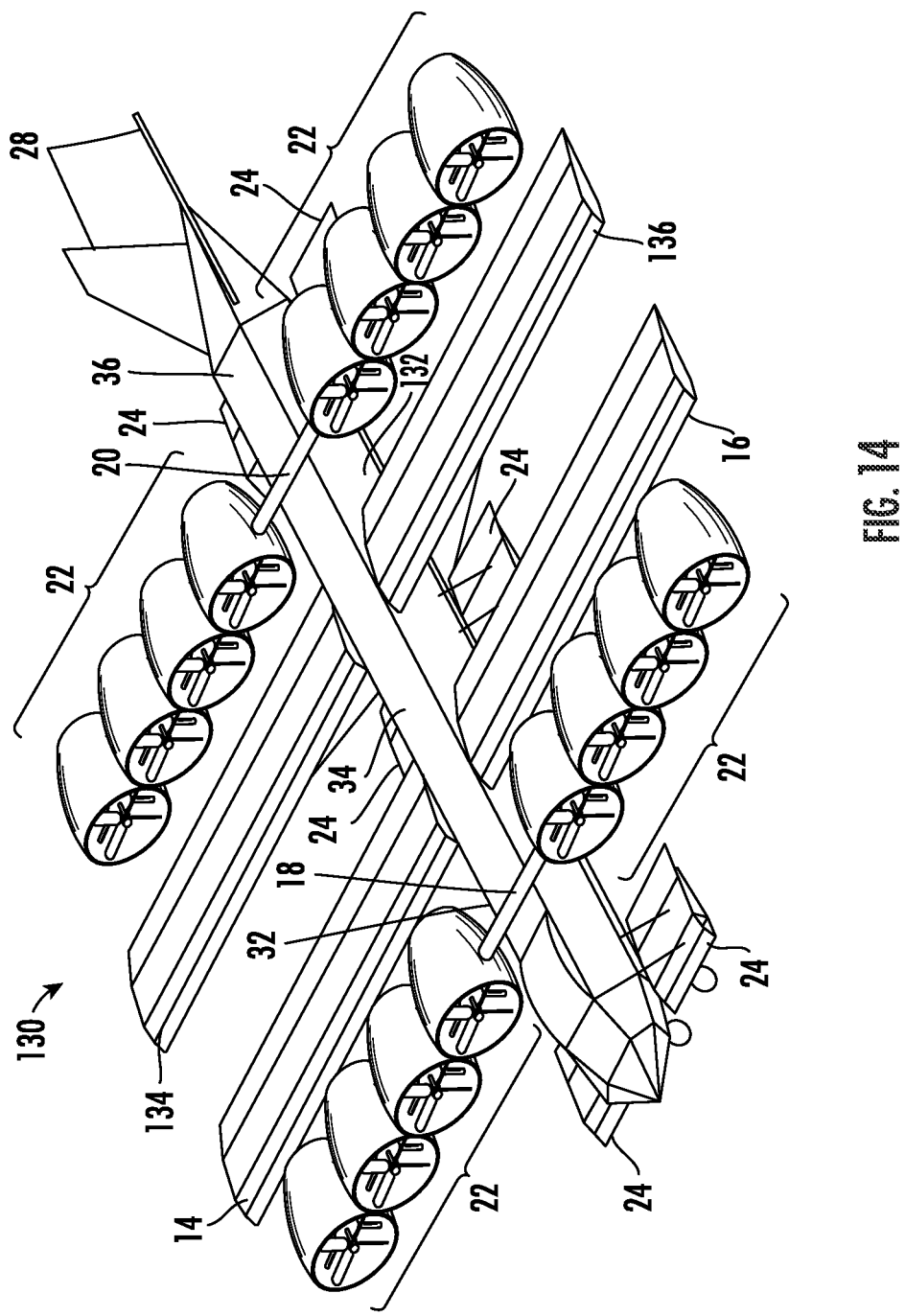
FIG. 14 is a perspective view of an extended aircraft, in accordance with some embodiments.

In some embodiments, there is an extended configuration for the aircraft 10 thus increasing the payload space. FIG. 14 is a perspective view of an extended aircraft 130, in accordance with some embodiments. This increases the overall length of the aircraft such as by increasing the fuselage 12 or adding a center middle section 132 to the fuselage 12 so that the overall length of the extended aircraft 130 is 60-70 feet or 64 feet. The center middle section 132 of the fuselage 12 can be described in the same manner as the fuselage 12 with reference to FIGS. 3A and 3B. A pair of wings such as a third wing 134 and a fourth wing 136 are coupled to the center middle section 132 of the fuselage 12. The third wing 134 and the fourth wing 136 can be described in the same manner as the first wing 14 and the second wing 16 with reference to FIGS. 1, 2B-2D and 4A-4B. For example, third wing 134 and the fourth wing 136 extend outwardly from opposite sides of the center middle section 132 of the fuselage 12.

The extended aircraft 130 includes a third amphibious landing gear system 24 coupled to an underside of the fuselage 12, such as between the underside of the center section 34 of the fuselage 12 and the center middle section 132 of the fuselage 12. The extended aircraft 130 may include more power generator systems 22 than the aircraft 10, such as sixteen (as shown) or twenty power generator systems 22. In one configuration, the extended aircraft 130 has a wingspan of 65 feet, a length of 64 feet and a height of 16 feet. The maximum takeoff is 22,000 kg, the payload is 13,500 kg, the maximum speed is 350 mph, the range of flight is 3,000 km.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An aircraft comprising:
   a fuselage extending along a longitudinal direction having a top surface opposite a bottom surface, a front section, a center section, and a rear section;
   a first mounting rod coupled to the top surface of the fuselage and extending outwardly from opposite sides of the front section of the fuselage;
   a second mounting rod coupled to the top surface of the fuselage and extending outwardly from opposite sides of the rear section of the fuselage, wherein the first mounting rod and the second mounting rod are single rods;
   a first wing opposite a second wing, the first and second wings coupled to the center section of the fuselage, the first and second wings extending outwardly from opposite sides of the center section of the fuselage;
   a plurality of power generator systems, each power generator system coupled to the first mounting rod or the second mounting rod and wherein each power generator system comprises:
      a power source, a first propeller and a second propeller, the power source configured to drive the first propeller and the second propeller, wherein the first propeller and the second propeller (i) have an axis of rotation, and (ii) are pivotable between a first position and a second position, the second position perpendicular to the first position;
      a shroud having a shroud first end opposite a shroud second end, and enclosing the power generator system;
   each power generator system further comprising:
      a gearbox coupled to the power source;
      a first shaft opposite a second shaft, the first shaft and the first propeller extending outwardly from a first side of the gearbox, and the second shaft and the second propeller extending outwardly from a second side of the gearbox opposite the first side of the gearbox;
   wherein the first shaft is longitudinally spaced apart from the second shaft, and the first shaft is not in contact with the second shaft;
   wherein the first propeller is coupled to the first shaft, the first shaft configured to transfer torque and rotation from the power source to the first propeller in a first direction; and
   wherein the second propeller is coupled to the second shaft, the second shaft configured to transfer torque and rotation from the power source to the second propeller in a second direction, and the first direction and the second direction are different from one another.

2. The aircraft of claim 1, wherein the first mounting rod and the second mounting rod are mounted perpendicular to the longitudinal direction of the fuselage.

3. The aircraft of claim 1, wherein a first and a second power generator system of the plurality of power generator systems are coupled to the first mounting rod and located on a first side of the fuselage, and a third and a fourth power generator system of the plurality of power generator systems are coupled to the first mounting rod and located on a second side of the fuselage.

4. The aircraft of claim 1, wherein each power generator system of the plurality of power generator systems is controlled independently from one another.

5. The aircraft of claim 1, wherein, with each power generator system, the power source is on a third side of the gearbox, the third side of the gearbox perpendicular to the axis of rotation of the first propeller and the second propeller.

6. The aircraft of claim 1, wherein, with each power generator system, the gearbox comprises:
   a first bevel gear attached to a third side of the gearbox and coupled to the power source;
   a second bevel gear on the first side of the gearbox that engages with the first bevel gear and the first shaft to enable the rotation of the first propeller in the first direction; and
   a third bevel gear on the second side of the gearbox that is spaced apart from the second bevel gear, and engages with the first bevel gear and the second shaft to enable the rotation of the second propeller in the second direction.

7. The aircraft of claim 1, wherein, with each power generator system, the gearbox comprises:
   a first bevel gear attached to a third side of the gearbox;
   a second bevel gear on the first side of the gearbox engages with the first bevel gear and the power source, the power source engages with the first shaft to enable the rotation of the first propeller in the first direction; and
   a third bevel gear on the second side of the gearbox is spaced apart from the second bevel gear, and engages with the first bevel gear and the second shaft to enable the rotation of the second propeller in the second direction.

8. The aircraft of claim 1, further comprising:
   an amphibious landing gear system coupled to the fuselage and having a lifting wing and a bladder, wherein the bladder is a) located under the lifting wing, b) configured to inflate and deflate, and c) sized to provide buoyancy for the aircraft when inflated.

9. The aircraft of claim 1, wherein the fuselage comprises a frame structure of a plurality of structural elements forming a hexagonally-shaped cross-section, and a material covering the frame structure.

10. An aircraft comprising:
    a first mounting rod coupled to a top surface of a fuselage and extending outwardly from opposite sides of a front section of the fuselage;
    a second mounting rod coupled to the top surface of the fuselage and extending outwardly from opposite sides of a rear section of the fuselage, wherein the first mounting rod and the second mounting rod are single rods;
    a plurality of power generator systems, each power generator system coupled to the first mounting rod or the second mounting rod, and wherein each power generator system comprises:
       a power source,
       a gearbox coupled to the power source,
       a first shaft opposite a second shaft, the first shaft and the second shaft extending outwardly from opposite sides of the gearbox, wherein the first shaft is longitudinally spaced apart from the second shaft, and the first shaft is not in contact with the second shaft;
       a first propeller coupled to the first shaft, the first shaft configured to transfer torque and rotation from the power source to the first propeller in a first direction;
       a second propeller coupled to the second shaft, the second shaft configured to transfer torque and rotation from the power source to the second propeller in a second direction, and the first direction and the second direction are different from one another;
    wherein the first propeller and the second propeller (i) have an axis of rotation, and (ii) are pivotable between a first position and a second position, the first position having the axis of rotation approximately horizontal and the second position having the axis of rotation approximately vertical.

11. The aircraft of claim 10, wherein the fuselage extends along a longitudinal direction, and the first mounting rod and the second mounting rod are mounted perpendicular to the longitudinal direction of the fuselage.

12. The aircraft of claim 10, wherein a first and a second power generator system of the plurality of power generator systems are coupled to the first mounting rod and located on a first side of the fuselage, and a third and a fourth power generator system of the plurality of power generator systems are coupled to the first mounting rod and located on a second side of the fuselage.

13. The aircraft of claim 12, wherein a fifth and a sixth power generator system of the plurality of power generator systems are coupled to the second mounting rod and located on a first side of the fuselage, and a seventh and an eighth power generator system of the plurality of power generator systems are coupled to the second mounting rod and located on a second side of the fuselage.

14. The aircraft of claim 10, wherein each power generator system of the plurality of power generator systems is controlled independently from one another.

15. The aircraft of claim 10, wherein, with each power generator system, the power source is on a third side of the gearbox, the third side of the gearbox perpendicular to the axis of rotation of the first propeller and the second propeller.

16. The aircraft of claim 10, wherein, with each power generator system, the gearbox comprises:
    a first bevel gear attached to a third side of the gearbox and coupled to the power source;
    a second bevel gear on a first side of the gearbox that engages with the first bevel gear and the first shaft to enable the rotation of the first propeller in the first direction; and
    a third bevel gear on a second side of the gearbox that is spaced apart from the second bevel gear, and engages with the first bevel gear and the second shaft to enable the rotation of the second propeller in the second direction.

17. The aircraft of claim 10, wherein, with each power generator system, the gearbox comprises:
    a first bevel gear attached to a third side of the gearbox;
    a second bevel gear on a first side of the gearbox engages with the first bevel gear and the power source, the power source engages with the first shaft to enable the rotation of the first propeller in the first direction; and a third bevel gear on a second side of the gearbox is spaced apart from the second bevel gear, and engages with the first bevel gear and the second shaft to enable the rotation of the second propeller in the second direction.

18. The aircraft of claim 10, further comprising:

an amphibious landing gear system coupled to the aircraft and having a lifting wing and a bladder, wherein the bladder is a) located under the lifting wing, b) configured to inflate and deflate, and c) sized to provide buoyancy for the aircraft when inflated.

19. The aircraft of claim 10, wherein the fuselage comprises a frame structure of a plurality of structural elements forming a hexagonally-shaped cross-section, and a material covering the frame structure.

* * * * *